3,390,087
SYNTHETIC LUBRICANT STABILIZED WITH
TRIORGANOTIN AND LEAD DERIVATIVES
OF FERROCENE
John P. Pellegrini, Jr., O'Hara Township, Allegheny
County, and Ilgvars J. Spilners, Monroeville, Pa., assignors to Gulf Research & Development Company,
Pittsburgh, Pa., a corporation of Delaware
No Drawing. Original application Dec. 28, 1964, Ser. No.
421,648, now Patent No. 3,350,434, dated Oct. 31, 1967.
Divided and this application Sept. 29, 1967, Ser. No.
671,554
8 Claims. (Cl. 252—49.7)

ABSTRACT OF THE DISCLOSURE

Organometallic derivatives of ferrocene are added to liquid polyorgano siloxane lubricating oils to decrease their normal tendency to volatilize and solidify when heated at 600° F. Specific examples of the organometallic derivatives include tributylstannylferrocene, triphenylstannylferrocene, triphenylplumbylferrocene, tributylplumbylferrocene, and 1,1' - bis(tributylstannyl)ferrocene.

---

This application is a division of our copending application Ser. No. 421,648, filed Dec. 28, 1964 and now Patent No. 3,350,434.

This invention relates to certain novel organometallic derivatives of ferrocene which are useful as addition agents to lubricating oils, and more particularly to organotin and organolead derivatives of ferrocene and to improve lubricants containing these organometallic derivatives of ferrocene.

The organometallic derivatives of ferrocene of this invention are represented by the following general formula

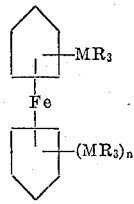

where M is a metal selected from the group consisting of tin and lead; R is a hydrocarbon radical selected from the group consisting of alkyl (e.g., methyl, ethyl, propyl, butyl and pentyl), aryl (e.g., phenyl and naphthyl), aralkyl (e.g., benzyl), alkaryl (e.g., tolyl and xylyl) and cycloalkyl (e.g., cyclopentyl and cyclohexyl) radicals; and $n$ is an integer of 0 to 1. A specific example of a preferred compound of the invention is triphenylstannylferrocene. Specific examples of other compounds included by the invention are tributylstannylferrocene; tributylplumbylferrocene; triphenylplumbylferrocene; 1,1' - bis(tributylstannyl)ferrocene; 1,1' - bis(triphenylstannyl)ferrocene; 1,1' - bis(trybutylplumbyl)ferrocene; and 1,1'-bis(tryphenylplumbyl)ferrocene. Examples of other such compounds are trimethylstannylferrocene
triethylstannylferrocene
tripropylstannylferrocene
tripentylstannylferrocene
trinaphthylstannylferrocene
tribenzylstannylferrocene
tritolylstannylferrocene
trixylylstannylferrocene
tricyclopentylstannylferrocene
tricyclohexylstannylferrocene
trimethylplumbylferrocene
triethylplumbylferrocene
tripropylplumbylferrocene
tripentylplumbylferrocene
trinaphthylplumbylferrocene
tribenzylplumbylferrocene
tritolylplumbylferrocene
trixylylplumbylferrocene
tricyclopentylplumbylferrocene
tricyclohexylplumbylferrocene
1,1'-bis(trimethylstannyl)ferrocene
1,1'-bis(triethylstannyl)ferrocene
1,1'-bis(tripropylstannyl)ferrocene
1,1'-bis(tripentylstannyl)ferrocene
1,1'-bis(trinaphthylstanny)ferrocene
1,1'-bis(tribenzylstannyl)ferrocene
1,1'-bis(tritolylstannyl)ferrocene
1,1'-bis(trixylylstannyl)ferrocene
1,1'-bis(tricyclopentylstannyl)ferrocene
1,1'-bis(tricyclohexylstannyl)ferrocene
1,1'-bis(trimethylplumbyl)ferrocene
1,1'-bis(triethylplumbyl)ferrocene
1,1'-bis(tripropylplumbyl)ferrocene
1,1'-bis(tripentylplumbyl)ferrocene
1,1'-bis(trinaphthylplumbyl)ferrocene
1,1'-bis(tribenzylplumbyl)ferrocene
1,1'-bis(tritolylplumbyl)ferrocene
1,1'-bis(trixylylplumbyl)ferrocene
1,1'-bis(tricyclopentylplumbyl)ferrocene
1,1'-bis(tricyclohexylplumbyl)ferrocene The organometallic derivatives of ferrocene of this invention are, in general, liquid or solid compounds, the solids melting at low or moderate temperatures. They are stable at ordinary temperatures and can be readily prepared and stored without special precautions for future use. The lead compounds melt, in general, at lower temperatures than the corresponding tin compounds and the melting points tend to increase with the molecular weights of the organic substituents designated as R in the formula given hereinabove.

The compounds of the invention can be prepared in any convenient way. For example, they can be prepared by reacting an alkali metal ferrocene with the desired organolead halide or organotin halide to give a reaction mass comprising a monosubstituted and/or a disubstituted product. Whether or not the reaction mass predominates in either the monosubstituted or the disubstituted product depends, at least in part, upon whether the initial reactant is a monometallated or dimetallated ferrocene or a mixture thereof. The preparation of the organometallic derivatives of ferrocene of this invention, according to one method, is illustrated by the following equations:

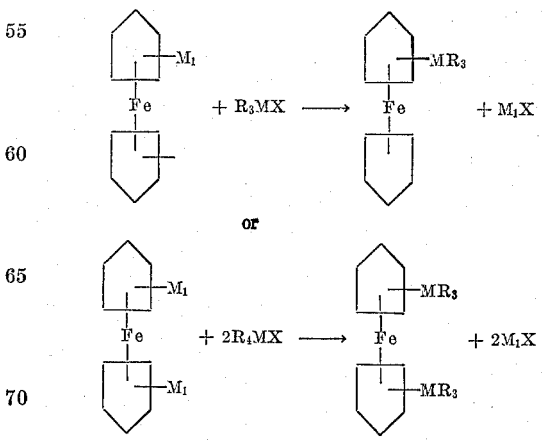

where $M_1$ is an alkali metal including lithium, sodium, potassium, rubidium and cesium, M is tin or lead, X is a halogen and R is selected from the group consisting of alkyl, aryl, aralkyl, alkaryl and cycloalkyl radicals.

In preparing the organometallic derivatives of ferrocene of the present invention according to the reactions shown in the above equations, the initial reactants require the preparation of dicyclopentadienyl iron which is commonly referred to as "ferrocene." Neither ferrocene nor its method of preparation constitutes any portion of the invention inasmuch as ferrocene is readily available commerically. Ferrocene can be prepared by passing a mixture of cyclopentadiene and nitrogen over a reduced iron catalyst at 300° C. Another method involves reaction of ferrous chloride with cyclopentadiene and diethylamine to give ferrocene (Organic Syntheses, volume 36, page 34, 1956). A third method of preparing ferrocene comprises a Grignard synthesis starting with cyclopentadiene, ethyl magnesium bromide and ferric chloride; this method for preparing ferrocene is disclosed by T. J. Kealy and P. L. Pauson in Nature, volume 168, page 1039 (1951). An alkali metal substituted ferrocene is obtained by reacting ferrocene with an alkyl alkali metal compound, such as an alkyl (e.g., ethyl, propyl, isobutyl, n-butyl, amyl, etc.) lithium. Metallation of ferrocene with n-butyllithium usually results in a mixture of the mono-substituted and the di-substituted derivatives, i.e., monolithioferrocene and dilithioferrocene. The molar concentrations of the n-butyllithium may be varied over a range of about 1 to 2 or more moles of the butyllithium per mole of the ferrocene, depending on the number of lithium atoms it is desired to attach on the ferrocene molecule. This reaction is advantageously carried out by dissolving the ferrocene in a solvent therefor, for instance tetrahydrofuran, and adding the n-butyllithium dissolved in the same or different solvent, for example, anhydrous ethyl ether, and allowing the reaction to proceed at about 25° to about 35° C. in an inert atmosphere for about 5 to about 40 hours or more.

The metallated ferrocene is thereafter reacted under anhydrous conditions with an organotin or an organolead halide of the formula

$$R_3MX$$

where R, M and X have the meaning given hereinabove. This reaction is advantageously carried out by adding the organotin or organolead halide dissolved in a solvent such as, for example, anhydrous ethyl ether, and permitting the mixture to reflux in an inert atmosphere for about 1 to 24 hours or more, with stirring. The organometallic derivative of the ferrocene is thereafter isolated by usual processing including distillation and recrystallization from solvents for the product, as for example methanol, to give usually both the di-substituted derivative and the mono-substituted derivative.

The reactants used in the preparation of the compounds of this invention can be employed in a wide variety of proportions. For example, the amount of the organolead halide or organotin halide employed with the metallated ferrocene (lithioferrocene in the above description) may vary depending upon the number of lithium atoms attached to the ferrocene molecule. If there is one lithium atom attached to each cyclopentadienyl group of the ferrocene, one will use at least 2 moles of the organometallic halide per mole of the dilithioferrocene. However, if the ferrocene has one lithium atom attached to only one of the cyclopentadienyl rings, one will use at least 1 mole of the organometallic halide per mole of the monolithioferrocene. Usually the reactants are employed in about stoichiometric equivalents but a moderate excess of one of the reactants is frequently desired to increase the rate of reaction.

The reaction of the metallated ferrocene with the organolead halide or organotin halide is preferably conducted in the presence of a solvent which is liquid under the reaction conditions and which is inert to the reactants and products. Examples of suitable solvents include benzene, toluene, n-hexane, petroleum naphtha, ethyl ether, diethylene glycol diethyl ether, diethylene glycol dibutyl ether and tetrahydrofuran. It will be understood that these solvents are not necessarily equivalent in all preparations. Preferred solvents are ethyl ether and tetrahydrofuran because of their relatively high solubility for the reactants and the resulting products.

The reaction between the metellated ferrocene and the organometal halide can be conducted at any temperature within the normal liquid range of the solvent or at a higher temperature if the liquid phase is maintained by the application of pressure. While room temperature is generally satisfactory, temperature slightly above room temperature are desirable in certain instances particularly where the reaction involves the higher molecular weight organometal halides. In general, the temperature is within the range of about 0° to about 150° C., the preferred range being about 25° to about 75° C. The reaction is readily carried out at atmopheric pressure. However, any pressure within the range of 10 mm. of mercury to 100 atmospheres can be used if desired.

The preparation of the compounds of the invention is carried out under an atmosphere inert to both the reactants and products. While the tin and lead compounds are stable on exposure to dry air, the use of dry nitrogen is preferred.

The reaction products of this invention are soluble in a number of organic solvents and thus can be purified by recrystallization from such solvents. Examples of suitable solvents for purifying the products include benzene, toluene, n-hexane, methanol, ethanol, methylene chloride, ethyl ether, petroleum ether and mixtures thereof.

The following examples will illustrate the general method employed in preparing some of the compounds of the invention.

Example I.—Triphenylstannylferrocene 25.5 grams (0.4 mole) of n-butyllithium in 250 ml. of anhydrous ethyl ether are added slowly over a period of about one hour to 37.2 grams (0.2 mole) of ferrocene in 200 ml. of tetrahydrofuran. The reaction mixture is stirred at room temperature for a period of about 15 to 20 hours. The reaction mixture thus obtained comprises a mixture of lithioferrocene and 1,1'-dilithioferrocene. The mixture of mono- and dilithioferrocenes, after being filtered through glass wool, is slowly added to 77 grams (0.2 mole) of triphenyltin chloride partially dissolved in anhydrous ethyl ether. The reaction mixture is stirred at room temperature for 14 hours and then refluxed with stirring for 8 additional hours. All of the above reactions are conducted in an atmosphere of dry nitrogen. The mixture is then allowed to cool to room temperature and filtered. The filtrate is washed with water until neutral. The solvent is then removed from the neutralized filtrate by flash evaporation. Any unreacted ferrocene is recovered at this point by sublimation. The residue is extracted with warm ethyl ether and filtered. The ether is then removed, leaving 30 grams of a yellow powder. This yellow powder upon recrystallization from hot methanol gives a product which melts at 143° to 144° C. Elemental infrared and mass spectrometric analysis of the yellow product shows that it comprises triphenylstannylferrocene (28% yield).

*Ultimate analysis.*—Found for product: Carbon, 62.66; hydrogen, 4.45; iron, 10.52; tin, 22.28. Calculated for triphenylstannylferrocene ($C_{28}H_{24}FeSn$): Carbon, 62.86; hydrogen, 4.49; iron, 10.44; tin, 22.21.

The infrared spectrum has the bands at 3040, 1475, 1425, 1135, 1102, 1072, 1020, 996, 835, 815, 730 and 696 cm.$^{-1}$ (in Nujol and Fluorolube).

Example II.—Triphenylplumbylferrocene

Triphenylplumbylferrocene was synthesized from lithioferrocene and triphenyllead chloride using the same molar ratios and conditions as in the synthesis of triphenylstannylferrocene of Example I. The final recrystallization gave a yellow powder which melts at 130° to 132° C. The infrared and elemental analysis shows that the yellow powder is triphenylplumbylferrocene (20% yield).

The infrared spectrum has the bands at 3040, 1570, 1465, 1425, 1335, 1105, 1065, 1020, 996, 836, 815, 725 and 695 cm.$^{-1}$ (in Nujol and Fluorolube).

*Ultimate analysis.*—Found for product: Carbon, 53.70; hydrogen, 3.96; iron, 9.20; lead, 33.95. Calculated for triphenylplumbylferrocene ($C_{28}H_{24}FePb$): Carbon, 53.93; hydrogen, 3.85; iron, 8.96; lead, 33.26.

Example III.—Tributylstannylferrocene

Tributylstannylferrocene was synthesized using the same method as in the synthesis of triphenylstannylferrocene of Example I except that tributyltin chloride (130 g., 0.4 mole) was added to lithioferrocene (0.2 mole) in ether-tetrahydrofuran. After the water wash and the recovery of unreacted ferrocene by sublimation and tributyltin chloride by distillation, the residue contained a red-brown oil. Since the molar ratio of lithioferrocene to tributyltin chloride used in the synthesis was 1 to 2, the unfractionated product (red-brown oil) contained both tributylstannylferrocene and 1,1'-bis(tributylstannyl)ferrocene. The tributylstannylferrocene (10 g., 10.5% yield) was separated by distillation as a red-brown oil, boiling point 188–190° C. at 0.15 mm. The infrared and mass spectrometry show that the oil comprises tributylstannylferrocene.

The infrared spectrum has the bands at 3040, 2960–2890, 1470, 1465, 1375, 1135, 1102, 1072, 1022, 998, 958, 875, 816, 770 and 690 cm.$^{-1}$.

Example IV.—1,1'-bis(tributylstannyl)ferrocene

After the collection of tributylstannylferrocene (Example III), the distillation was continued. 23 grams of red-brown oil was collected, boiling point of 270° C. at 0.65 mm. of Hg. The infrared spectrum of this oil is very similar to the spectrum of the oil in Example III. An exception is the weakness of the bands at 1102 and 998 cm.$^{-1}$ which suggests the presence of 1,1'-disubstituted ferrocene [1]. The spectrum shows that this oil is predominantly 1,1'-bis(tributylstannyl)ferrocene.

The foregoing examples are illustrative only. Other organometallic derivatives of ferrocene can be prepared in a similar manner by substitution of other suitable materials as disclosed herein in the same or equivalent proportions as used in the foregoing specific embodiments. For example, the mono- and di-substituted methyl-, ethyl-, propyl-, pentyl-, naphthyl-, benzyl-, tolyl-, cyclopentyl- and cyclohexyltin and lead derivatives of ferrocene are similarly prepared when reacting the corresponding organometallic halide with the appropriate alkali metal ferrocene.

The novel compounds of this invention are of value as addition agents to lubricating oils. We have found, for example, that the organometallic derivatives of ferrocene and particularly the tributyltin, triphenyltin and triphenyllead derivatives of ferrocene are useful in decreasing the volatilization and solidification tendencies of synthetic lubricating oils such as the liquid polyorgano siloxanes when such oils are heated at 600° F. in the presence of air over prolonged periods. The polyorgano siloxanes are known commercially as silicones and are made up of silicon and oxygen atoms wherein the silicon atoms may be substituted with alkyl, aryl, alkaryl, aralkyl and cycloalkyl radicals. Exemplary of such compounds are the dimethyl silicone polymers, diethyl silicone polymers, ethylphenyl silicone polymers and methylphenyl silicone polymers. We also intend to include the halogenated silicones such as the fluorosilicones. We have obtained especially good results with polyorgano siloxanes having a high phenyl content and diphenylmethylsilyl end groups. Polyorgano siloxanes having a high phenyl content and diphenylmethylsilyl end groups can be obtained by hydrolyzing and polymerizing a mixture of diphenylmethylchlorosilane, dimethyldichlorosilane and diphenyldichlorosilane preferably in a mole ratio of 1:1:1, respectively, according to procedures known to those familiar with the art. While the polyorgano siloxanes are generally a mixture of polymers, a general formula representing the polymer mixture by an ideal molecule is as follows:

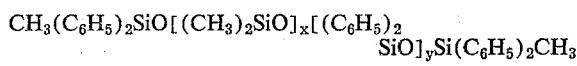

where $x$ and $y$ can be from 1 to 10 or more. An ideal molecule of a polyorgano siloxane having diphenylmethylsilyl end groups and a molecular weight of 954 is represented by the formula

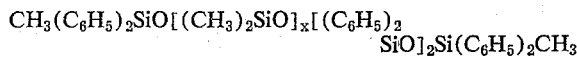

The amount of the organometallic ferrocene which we use may vary depending upon the particular lubricating base employed and upon the characteristics desired in the ultimate composition. In general, the amount of the organometallic ferrocene required to improve the volatilization and solidification characteristics of the oil is about 0.01 to about 1 percent by weight of the oil. However, larger proportions up to about 2 percent by weight or more of the composition can be used if desired. In any event, a small amount of the organometallic ferrocene, sufficient to decrease the volatilization and solidification tendencies of the oil, is used.

In order to illustrate the improved characteristics of lubricating compositions containing an organometallic derivative of ferrocene of this invention, the solidification tendencies of a synthetic lubricating oil was compared with the solidification tendencies of the same base oil containing various organometallic derivatives of ferrocene. The solidification test used in making the comparisons comprises placing ten grams of the test lubricant into 50 ml. beakers cut to a height of 1⅝ inches. The beakers are covered with stainless steel lids having a vapor vent of ⅛″ I.D. stainless steel tubing one centimeter high. The beakers are placed in an oven where they are heated at a temperature of 600° F. in the presence of air. The beakers are withdrawn periodically and weighed to determine the extent of evaporation. The mobility of the fluids at 600° F. and after cooling to 80° F. is also observed.

In the solidification tests summarized in Table I, the lubricating oil employed was a synthetic lubricating oil known as QF-6-70-24 Fluid marketed by Dow-Corning Corporation. This fluid is considered to be a methylphenylsiloxane polymer wherein the "end" silicon atoms are substituted to a high degree by two phenyl groups and one methyl group. The material is highly resistant to radiation. QF-6-7024 Fluid has as typical characteristics a viscosity at 100° F. of about 930 to 1030 SUS, a viscosity at 210° F. of about 90 to 100 SUS, a viscosity index of about 108 to 110 and a pour point of +10° to +20° F. It is believed that the types of side chains present and their approximate molar percentages (in brackets) in QF-6-70-24 Fluid are phenyl (65), methyl attached through silicon to methyl (25) and methyl attached through silicon to phenyl (10). An ideal molecule of a polyorgano siloxane having this analysis is as follows:

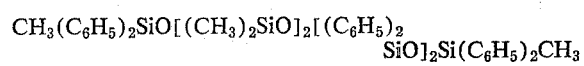

The improved characteristics of a synthetic lubricating composition containing an organometallic ferrocene is evidenced by the data in Table I showing that the organometallic ferrocene gives a marked increase in the time over which the lubricating composition remains fluid at 80° F. and at 600° F.

---
[1] M. Rosenblum and R. B. Woodward, J. Am. Chem. Soc. 80, 5443 (1958).

TABLE I

| Composition, Percent by Weight | A | B | C | D | E | F | G |
|---|---|---|---|---|---|---|---|
| Lubricating Oil QF-6-7024 | 100 | 99.98 | 99.94 | 99.9 | 99.8 | 99.8 | 99.8 |
| Organometallic Ferrocene: | | | | | | | |
| Tributylstannylferrocene of Example III | | 0.02 | 0.06 | 0.1 | 0.2 | | |
| Triphenylstannylferrocene of Example I | | | | | | 0.2 | |
| Triphenylplumbylferrocene of Example II | | | | | | | 0.2 |
| Inspection—Number of hours to solidification after heating to 600° F. with examination: | | | | | | | |
| At 80° F | 144 | 240 | 240 | 336 | 384 | 552 | 216 |
| At 600° F | 192 | 288 | 336 | 456 | 480 | 600 | 312 |

In addition to a compound of the type disclosed herein, we can incorporate other "additive" agents in the lubricating oil, if desired, to improve other specific properties of the lubricant. Thus, for example, the lubricating composition can contain a corrosion and rust inhibitor, an extreme pressure agent, an anti-oxidant, a metal deactivator, a foam inhibitor, a pour point depressant, a viscosity index improver, a thickening agent, a dye and the like. Whether or not such additives are employed and the amounts thereof depend to a large extent upon the severity of the conditions to which the composition is subjected and upon the stability of the synthetic lubricating oil base in the first instance. When such conventional additives are used they are generally added in amounts between about 0.01 and 5 percent by weight based on the weight of the total composition. The improved lubricating oil is an excellent base oil for use in preparing a thickened lubricant such as a lubricant having the consistency of a grease.

While the organometallic derivatives of ferrocene of this invention have been described with particular reference to their ability to reduce the solidification tendencies of a synthetic lubricating oil when it is heated to 600° F. in the presence of air, the organometallic derivatives of ferrocene may also serve as useful addition agents for mineral lubricating oils and hydrocarbon fuels. The organometallic derivatives of ferrocene can be added to lubricating as well as industrial oils including crankcase lubricating oils, transformer oils, turbine oils, transmission fluids, cutting oils, glass annealing oils, gear oils, mineral white oils, oils thickened with soaps as well as with organic and inorganic thickening agents, hydraulic fluids, polymer and rubber compositions and the like.

While our invention has been described with reference to various specific examples and embodiments, it will be understood that the invention is not limited to such examples and embodiments and may be variously practiced within the scope of the claims hereinafter made.

We claim:

1. A lubricating composition consisting essentially of a liquid polyorgano siloxane lubricating oil normally tending to volatilize and solidify when heated at 600° F. in the presence of air and a small amount, sufficient to decrease the volatilization and solidification tendencies of the lubricating oil, of an organometallic derivative of ferrocene represented by the general formula

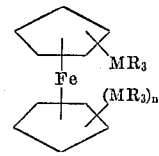

where M is a metal selected from the group consisting of tin and lead; R is a hydrocarbon radical selected from the group consisting of alkyl, aryl, aralkyl, alkaryl and cycloalkyl radicals; and $n$ is an integer of 0 to 1.

2. A lubricating composition consisting essentially of a liquid polyorgano siloxane lubricating oil normally tending to volatilize and solidify when heated at 600° F. in the presence of air and a small amount, sufficient to decrease the volatilization and solidification tendencies of the lubricating oil, of an organotin derivative of ferrocene represented by the general formula

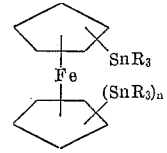

where R is a hydrocarbon radical selected from the group consisting of alkyl, aryl, aralkyl, alkaryl and cycloalkyl radicals; and $n$ is an integer of 0 to 1.

3. A lubricating composition consisting essentially of a liquid polyorgano siloxane lubricating oil normally tending to volatilize and solidify when heated at 600° F. in the presence of air and a small amount, sufficient to decrease the volatilization and solidification tendencies of the lubricating oil, of an organolead derivative of ferrocene represented by the general formula

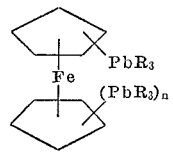

where R is a hydrocarbon radical selected from the group consisting of alkyl, aryl, aralkyl, alkaryl and cycloalkyl radicals; and $n$ is an integer of 0 to 1.

4. A lubricating composition consisting essentially of a liquid polyorgano siloxane lubricating oil and about 0.01 to about 2 percent by weight of tributylstannylferrocene.

5. A lubricating composition consisting essentially of a liquid polyorgano siloxane lubricating oil and about 0.01 to about 2 percent by weight of triphenylstannylferrocene.

6. A lubricating composition consisting essentially of a liquid polyorgano siloxane lubricating oil and about 0.01 to about 2 percent by weight of triphenylplumbylferrocene.

7. A lubricating composition consisting essentially of a liquid polyorgano siloxane lubricating oil and about 0.01 to about 2 percent by weight of tributylplumbylferrocene.

8. A lubricating composition consisting essentially of a liquid polyorgano siloxane lubricating oil and about 0.01 to about 2 percent by weight of 1,1'-bis(tributylstannyl)ferrocene.

References Cited

UNITED STATES PATENTS

| | | | |
|---|---|---|---|
| 3,002,989 | 10/1961 | Awe et al. | 252—49.7 XR |
| 3,060,215 | 10/1962 | Rosenberg et al. | 252—49.7 XR |
| 3,265,621 | 8/1966 | De Young | 252—49.7 |
| 3,306,851 | 2/1967 | McCarthy et al. | 252—49.7 XR |
| 3,313,835 | 4/1967 | Wilkus et al. | 252—49.7 XR |

DANIEL E. WYMAN, *Primary Examiner.*

PATRICK P. GARVIN, *Examiner.*